United States Patent [19]

Jayant

[11] Patent Number: 4,726,037

[45] Date of Patent: Feb. 16, 1988

[54] PREDICTIVE COMMUNICATION SYSTEM FILTERING ARRANGEMENT

[75] Inventor: Nuggehally S. Jayant, Short Hills, N.J.

[73] Assignee: American Telephone and Telegraph Company, AT&T Bell Laboratories, Murray Hill, N.J.

[21] Appl. No.: 844,076

[22] Filed: Mar. 26, 1986

[51] Int. Cl.[4] ............................................. H04B 14/06
[52] U.S. Cl. ................................. 375/27; 332/11 D; 381/30
[58] Field of Search ....................... 375/27, 30, 31, 32, 375/33, 34, 122; 381/29, 30, 31, 32; 358/135, 138; 332/11 D

[56] References Cited

U.S. PATENT DOCUMENTS

| | | | |
|---|---|---|---|
| 3,631,520 | 12/1971 | Atal | 364/513.5 |
| 3,715,512 | 2/1973 | Kelly | 381/30 |
| 3,922,606 | 11/1975 | Nordling | 375/30 |
| 3,973,199 | 8/1976 | Widmer | 375/30 |
| 4,133,976 | 1/1979 | Atal et al. | 381/47 |
| 4,411,003 | 10/1983 | Su | 375/33 |
| 4,549,304 | 10/1985 | Weirich et al. | 375/27 |
| 4,592,070 | 5/1986 | Chow et al. | 332/11 D |
| 4,617,676 | 10/1986 | Jayant et al. | 375/122 |

OTHER PUBLICATIONS

*AT&T Bell Laboratories Technical Journal*, vol. 63, No. 8, Oct. 1984, "Enhancement of ADPCM Speech by Adaptive Postfiltering", V. Ramamoorthy and N. S. Jayant, pp. 1465–1475.

*The Bell System Technical Journal*, vol. 52, No. 7, Sept. 1973, "Adaptive Quantization in Differential PCM Coding of Speech", P. Cummiskey, N. S. Jayant and J. L. Flanagan, pp. 1105–1119.

*Primary Examiner*—Robert L. Griffin
*Assistant Examiner*—Stephen Chin
*Attorney, Agent, or Firm*—Jack S. Cubert; Wilford L. Wisner

[57] ABSTRACT

A digital speech signal communication system includes a decoder that generates a predictively coded speech signal responsive to received digital codes and predicitve parameters corresponding thereto. A signal representative of the quality of said predictively coded speech signal is formed and the predictively coded speech signal is modified responsive to the quality representative signal and the predictive parameters, The quality representative signal may be generated by combining a signal corresponding to the step of each predictive code with the predictive parameters for the received code to form a signal representing an estimate of the noise in the predictive code.

7 Claims, 12 Drawing Figures

PREDICTIVE COMMUNICATION SYSTEM FILTERING ARRANGEMENT

TECHNICAL FIELD

Our invention relates to digital communication and more particularly to signal processing adapted to reduce noise effects in digital communication systems.

BACKGROUND OF THE INVENTION

Coding of signals for transmission over a digital channel generally includes sampling an input, quantizing the samples, and forming a digital code for each quantized sample. A replica of the input is produced by decoding the digital codes corresponding to the input into a time sequence of signal samples and low pass filtering the sample sequence. As is well known in the art, some types of signals such as speech patterns are highly correlated so that portions thereof can be predicted from past values. By taking advantage of the predictive nature of such signals, the channel bit rate may be substantially reduced.

Predictive coding of signals as disclosed in U.S. Pat. No. 3,631,520, issued to B. S. Atal, Dec. 28, 1971, and assigned to the same assignee, involves the generation of predictive parameters from a succession of signal samples and the formation of a predicted value for each sample from the generated parameters and the preceding signal samples. The difference between each sample and its predicted value is quantized, encoded and sent to a receiver wherein the difference signal is decoded and combined with the corresponding predictive value formed in the receiver.

U.S. Pat. No. 4,411,003, issued to James C. Su, Oct. 18, 1983, discloses a multiloop adaptive Delta Modulator in which a delta modulated bit stream is applied to a filter having selectable filter characteristics dependent on the autocorrelation functions. In this way the bit stream may be modified in accordance with the type of speech pattern being coded. While this patent demonstrates that signal improvement may be achieved by considering the characteristics of the speech pattern applied to coding apparatus, it does not disclose the utilization of the adverse effects of quantization as a means of adapting the coding process to improve speech signal quality.

Quantizing a signal sample is accomplished as is well known by selecting the closest of a set of specified amplitude levels. The approximation introduced by quantization, however, results in noiselike distortion. Such quantization noise may be reduced by forming an error signal corresponding to the difference between the quantized and unquantized signals and modifying the signal samples in a prescribed manner responsive to the error signal. While the total quantizing noise level is unaffected by the modification, the noise may be reshaped so that it is concentrated in a specific portion of the signal spectrum where its effects are minimized. For speech signals, quantizing noise may be concentrated in formant regions of the speech signal spectrum. This results in the noise being masked so that it is not perceived by the listener.

U.S. Pat. No. 4,133,976 issued to B. S. Atal et al, Jan. 9, 1979, and assigned to the same assignee discloses a circuit adapted to redistribute quantizing noise in a speech signal spectrum during the digital encoding of the signal. The use of such a circuit in a digital coding scheme results in a significant reduction in the perceived quantizing noise. The circuit arrangements, however, are relatively complex and presume that the communication system operates at a predetermined bit rate.

The article "Enhancement of ADPCM Speech by Adaptive Postfiltering" by V. Ramamoorthy and N. S. Jayant appearing in the AT&T Bell Laboratories Technical Journal, pp. 1465–1475, October 1984, discloses an arrangement to reduce quantizing noise effects in a variable bit rate communication system in which the transmission bit rate at a predictive decoder is detected and the predictively decoded signal is modified responsive to the bit rate and the prediction parameters. The arrangement requires use of bit rate signals in the filtering circuitry and assumes the noise level of the predictively decoded signal varies only as a function of bit rate. It is known, however, that the noise level varies widely at each bit rate. While it is generally known that the quality of digital speech transmission is poorer at lower bit rates, filtering as a function of transmission bit rate as in the V. Ramamoorthy and N. S. Jayant article does not account for variations in quality of the coded speech signal at a particular bit rate. It is an object of the invention to provide improved digital signal coding that reduces quantizing noise effects for communication at a variable bit rate as a function of the noise in the predictively decoded signal.

BRIEF SUMMARY OF THE INVENTION

The invention is directed to a digital speech signal communication system having a circuit that generates a predictively coded speech signal and predictive parameters corresponding thereto. A signal representative of the quality of said predictively coded signal is formed, and the predictively coded signal is modified responsive to the quality representative signal and the predictive parameters.

According to one aspect of the invention, the quality representative signal is formed by generating a signal representative of the noise in each predictive code.

According to yet another aspect of the invention, the generation of the signal representative of the noise in each predictive code comprises forming a signal representative of the step size for each predictive code.

According to yet another aspect of the invention, an estimate of the noise in each predictive code is produced by combining the step-size representative signal with the predictive parameter signals for the predictive coded signal.

According to yet another aspect of the invention, the modifying arrangement includes a spectral filter responsive to said control signals and the predictive parameter signals for each predictively coded signal adapted to enhance predictively decoded signal component spectral regions and suppressing other spectral regions. Advantageously, the signal-to-background noise ratios in the spectral regions of each predictively decoded signal is improved and the residual noise spectrum is perceived as signal-like in the predictively decoded signal spectral regions.

In an embodiment illustrative of the invention, a sequence of predictive codes representative of a speech pattern is received. A predictively decoded signal and predictive parameter signals are generated responsive to received digital codes. A signal is produced that is representative of the quantizing noise in the predictively decoded signal by combining the step-size signal with the prediction parameter signals for each predictively decoded signal and control signals are formed responsive to the combined signal. The predictively decoded signal is then modified responsive to said control signals and said predictive parameter signals to reduce its signal-to-background noise level.

DETAILED DESCRIPTION

Figure 1:
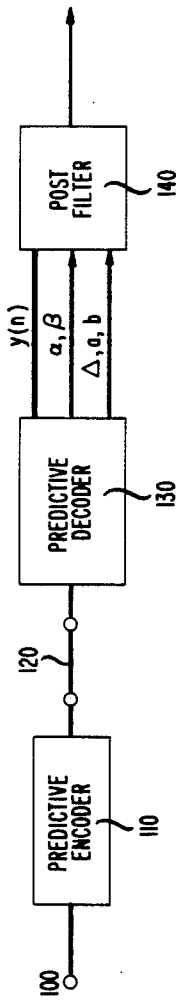
FIG. 1 depicts a general block diagram of a digital speech communication arrangement illustrative of the invention.

A general block diagram of a digital speech communication system illustrative of the invention is shown in FIG. 1. Referring to FIG. 1, a speech signal is converted into an analog electrical signal by transducer 100. Predictive encoder 110 is operative to generate a sequence of digital coded signals corresponding to the analog signal from transducer 100. As is well known in the art, coder 110 is adapted to take advantage of the redundancy inherent in a speech pattern to reduce the digital code rate required for transmission. The coder includes circuitry for generating a set of predictive parameters for each successive time frame interval of the input signal and for forming a sequence of coded signals for the interval responsive to the predictive parameters and the successive signal samples of the interval. The coded signals are transmitted over digital channel 120 and are received by digital decoder 130.

Decoder 130 is operative to produce predictive parameters from the received coded signals and to combine the coded signals with the predictive parameters to generate a sequence of coded signals corresponding to the signal applied to encoder 110. The output of decoder 130 contains noise that results from the quantization of the input signal in coder 110 and noise from channel 120. In accordance with the invention, post filter 140 is adapted to modify the output signal from decoder 130 so that the effect of noise on the quality of the output signal is mitigated. This is accomplished by applying the predictive parameter signals a and b developed in decoder 130 and filter control signals $\alpha$ and $\beta$ corresponding to the quality of the received coded signals to post filter 140 and shaping the post filter characteristics jointly responsive to the predictive parameters and the quality corresponding signals.

The predictive parameter signals a and b from decoder 130 are indicative of the spectrum of decoder output signal and may be used to enhance the output signal spectral portions and to suppress other portions of the spectrum. The quality corresponding signals $\alpha$ and $\beta$ determine the degree to which the output signal from decoder 130 is to be modified by the predictive parameters. The quality corresponding signal may be obtained from the adaptive step size and the predictive parameter signals available in the decoder. While the post filter of FIG. 1 is shown as apparatus independent of the decoder, alternatively, it may be part of the decoder.

Figure 2:
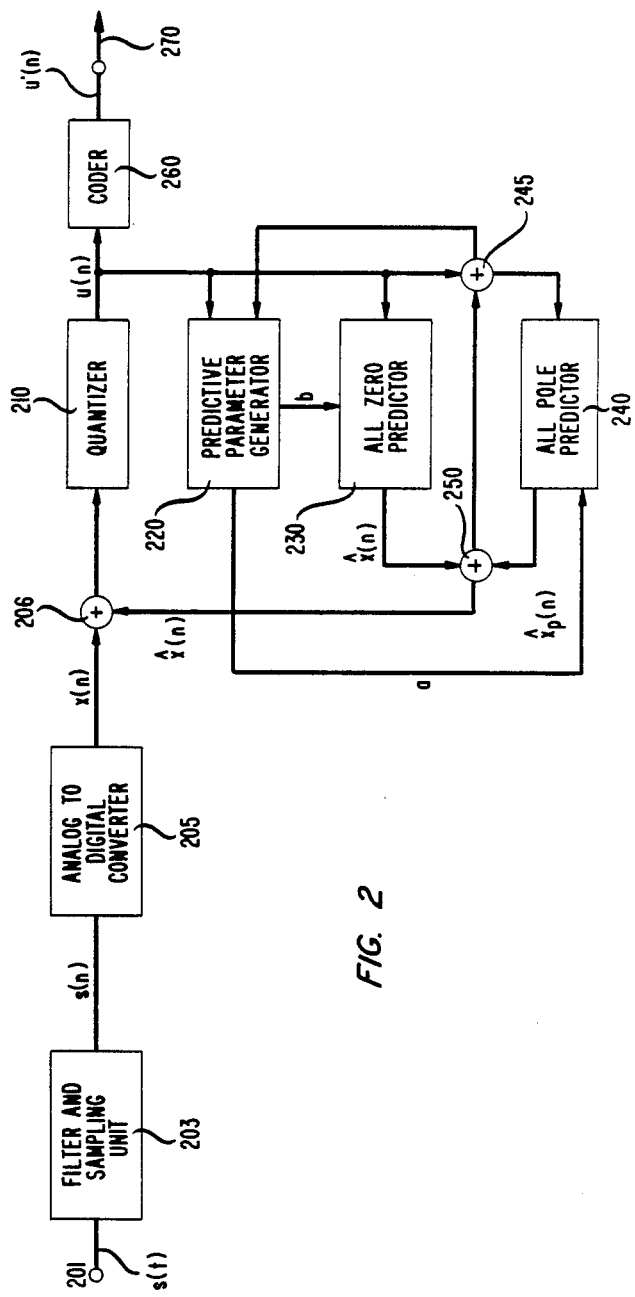
FIG. 2 shows a block diagram of an adaptive differential pulse code modulation coder that may be used in the circuit of FIG. 1.

FIG. 2 shows a predictive speech encoding circuit that may be used in the circuit of FIG. 1. A speech signal s(t) is supplied from transducer 201 to filter and sampling circuit 203 in which signal s(t) is filtered and sampled at a predetermined rate. Circuit 203 may comprise a low pass filter with a cut off frequency of 4 kHz and a sampler having a sampling rate of 8 kHz. The successive samples s(n) from filter and sampling circuit 203 are applied to analog-to-digital converter 205 wherein a digital code x(n) is produced for each sample s(n). A coded signal representative of the predicted value of signal $\hat{x}(n)$ is generated $$\hat{x}(n)=\hat{x}_z(n)+\hat{x}_p(n) \tag{1a}$$

where $$\hat{x}_p(n) = \sum_{j=1}^{2} a_j(n)y(n-j) \tag{1b}$$

$$\hat{x}_z(n) = \sum_{j=1}^{6} b_j(n)u(n-j) \tag{1c}$$

and y(n) is the reconstructed output. $\hat{x}(n)$ is subtracted from signal x(n) in summing circuit 206. The resulting difference signal is quantized in quantizer 210 and the quantized signal is coded at a selected bit rate in coder 260. The coded signal u'(n) is then applied to transmission channel 270.

The predictive signal generating arrangements in FIG. 2 to reduce redundancy in signal u(n) include predictive parameter generator 220, all-zero predictor 230, all-pole predictor 240 and summing circuits 245 and 250. Predictive parameter signal generator 220 is operative to form pole and zero predictive signals in accordance with $$a_j(n) = \lambda_j a_j(n-1) + \mu_j sgn[(u(n-1)]sgn[y(n-1-j)] \tag{2}$$

$$j = 1,2, \lambda_1 = \frac{511}{512}, \lambda_2 = \frac{255}{256}, \mu_1 = \mu_2 = 0.008$$

$$b_j(n) = \lambda_j^1 b_j(n-1) + \mu_j^1 sgn[u(n-1)]sgn[u(n-1-j)] \tag{3}$$

$$j = 1 \text{ to } 6, \lambda_j^1 = \frac{255}{256}, \text{ and } \mu_j^1 = 0.008 \text{ for all } j.$$

The predictive parameter generator may comprise a microprocessor arrangement such as the TMS 320 signal processor device produced by Texas Instruments having a permanently stored set of instructions adapted to perform the parameter generation. Any of the well known predictive parameter generation arrangements may also be used. All-zero predictor 230 is adapted to produce a signal in accordance with equation 1(c).

Figure 7:
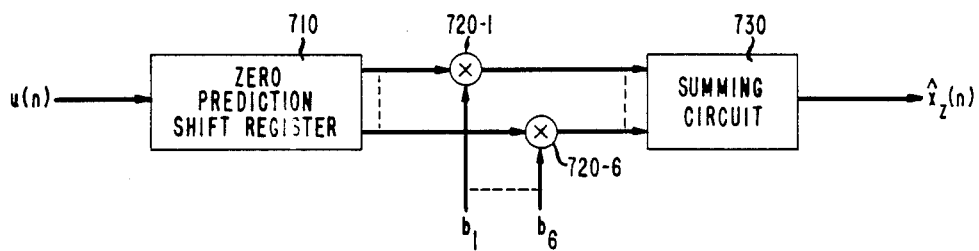
FIG. 7 shows a detailed block diagram of a circuit that may be used as a zero-pole predictor in FIGS. 2 and 3.

The all-zero predictor may comprise the circuit shown in FIG. 7 which includes shift register 710, multiplier circuits 720-1 through 720-6 and summing circuit 730. In FIG. 7, the signal u(n) is applied to the input of shift register 710 and is successively delayed therein. The delayed outputs from the shift register are multiplied by coefficients $b_j$ in circuits 720-1 through 720-6. The multiplier outputs are summed in adder 730 to form signal $\hat{x}_z(n)$.

Figure 8:
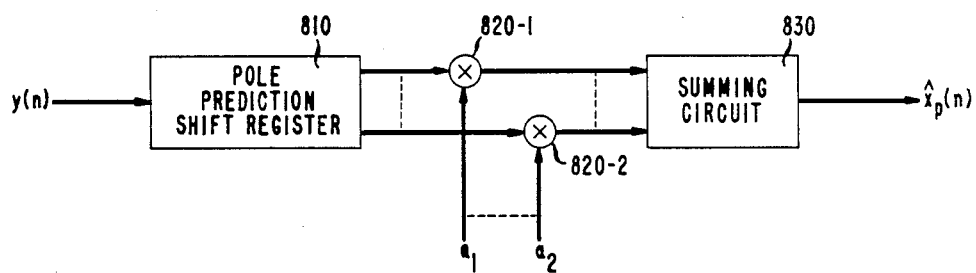
FIG. 8 shows a detailed block diagram of a circuit that may be used as an all-pole predictor in FIGS. 2 and 3.

All-pole predictor 240 generates the output signal $\hat{x}_p(n)$ of equation 1b. The all-pole predictor may be implemented in the arrangement shown in FIG. 8. Referring to FIG. 8, signal y(n) is supplied to delay shift register 810 and the successively delayed outputs therefrom are multiplied by coefficients $a_j$ in multipliers 820-1 and 820-2. The multiplier output signals are summed in adder 830 to form the signal $\hat{x}_p(n)$.

The quantized difference signal from quantizer 210

$$u(n) = Q[x(n) - \hat{x}(n)] \quad (4)$$

is applied to predictive parameter signal generator 220, all-zero predictor 230 and summing circuit 245. Predictive parameter generator 220 combines the quantized difference signal and output of summer 245 to form the set of zero prediction parameters a and the set of pole prediction parameters b in accordance with equations 2 and 3. The a parameter signals are supplied to all-pole predictor 240 and the b parameter signals are supplied to all-zero predictor 230.

Predictor 230 modifies the quantized difference signal and applies its output $\hat{x}_p(n)$ to summing circuit 250. Predictor 240 receives the outputs of summer 245 and predictive parameter generator 220 and provides the pole prediction signal $\hat{x}_p(n)$ to summer 250. The current predicted output signal $\hat{x}(n)$ is then applied to summer 206.

Figure 9:
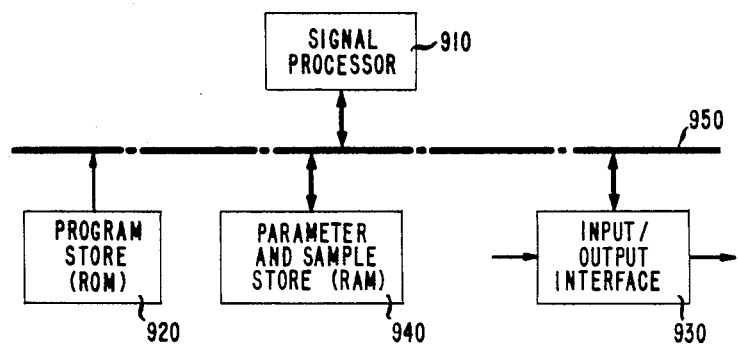
FIG. 9 shows an alternate circuit that may be used as the decoder in FIG. 1.

Alternatively, the functions of the adaptive encoder of FIG. 2 may be performed in a signal processor arrangement such as shown in FIG. 9. The arrangement includes bus 950, microprocessor 910 which may be the type TMS 320 signal processor device, a read only memory 920 having permanently stored program instructions therein known in the art to control the predictive encoding process, input-output interface circuit 930 and random access memory 940.

Coder 260 in FIG. 2 is adapted to convert the digital signal from quantizer 210 into a digital code suitable for transmission over channel 270. The channel bit rate may be 4 bits per output signal from quantizer 210 under normal traffic conditions but could be reduced to 3 or 2 bits as the traffic is increased. Independent of the bit rate, the quantizing noise varies during the digital code transmission. Filtering of the signal to be transmitted as known in prior art encoders may reduce the quantizing noise. Such filtering, however, increases the cost and complexity of the encoder and does not readily accommodate changes in quality of the signal caused by affect noise introduced in the transmission channel.

Figure 3:
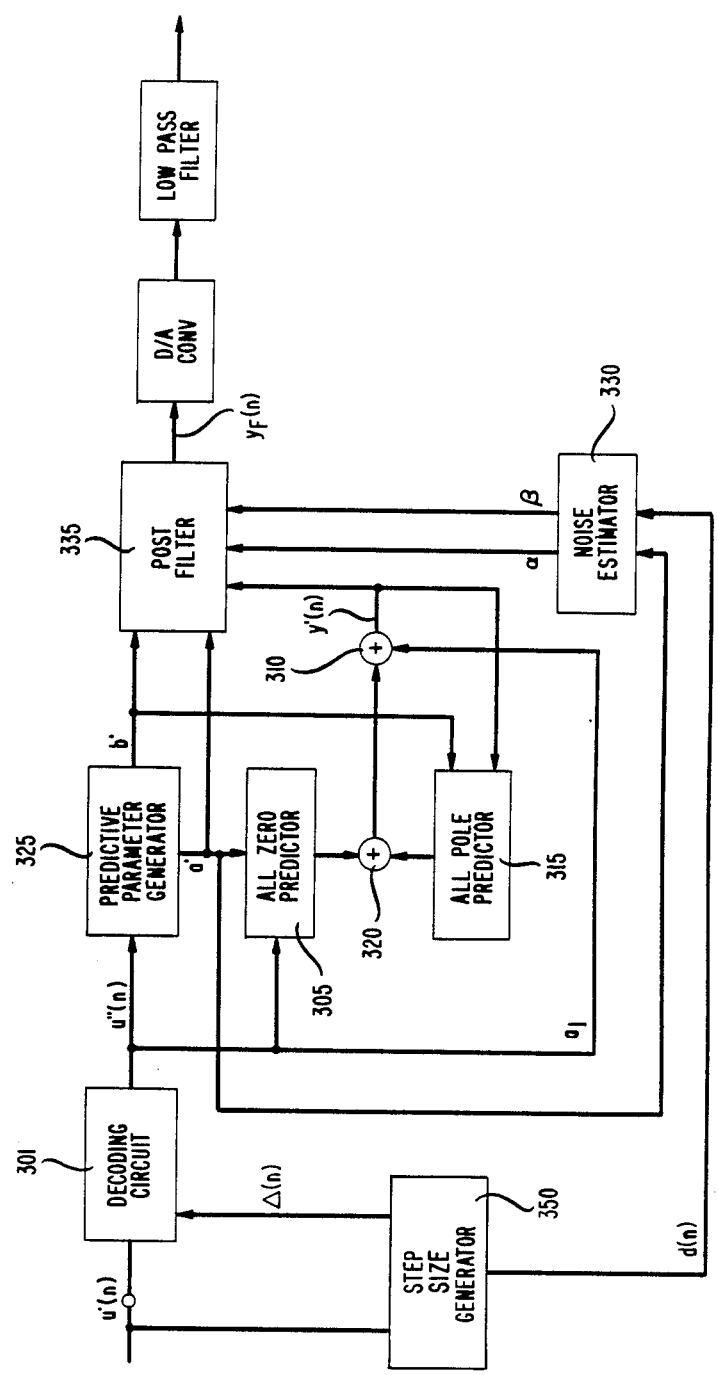
FIG. 3 shows a block diagram of an adaptive decoder that may be used in the circuit of FIG. 1 in accordance with the invention.
Figure 10:
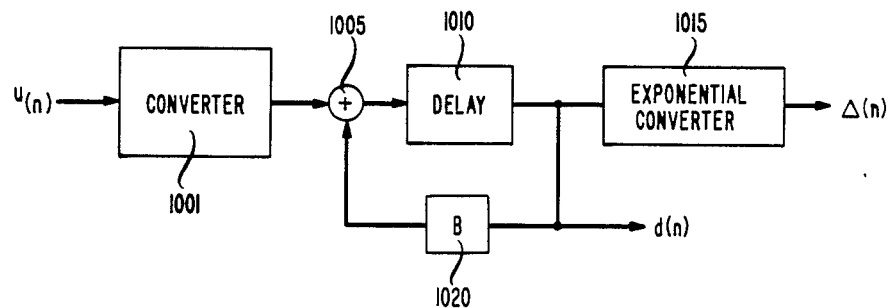
FIG. 10 shows a circuit that may be used as a step-size generator in the decoder of FIG. 3.

Digital decoder 130 is shown in greater detail in the block diagram of FIG. 3. In FIG. 3, decoding circuit 301 is operative to convert the binary code sequence of signal u'(n) applied thereto to multilevel quantized signals u"(n). As such, decoding circuit 301 operates as an inverse quantizer. Step-size generator circuit 350 shown in greater detail in FIG. 10 is arranged to produce a step-size signal $\Delta(n)$ and a log step-size signal d(n) for each received code of signal u'(n) according to $$\Delta(n) = \Delta(n-1)M(n)$$

where M(n) is a function of received binary code u'(n) that is indicative of the quality of the received code as is well known in the art. The design and use of step-size adaptations is described in the article "Adaptive Quantization in Differential PCM Coding of Speech" by P. Cummiskey, N. S. Jayant and J. L. Flanagan appearing in the *Bell System Technical Journal*, Vol. 52, No. 7, pp. 1105–1117, September 1973. Referring to FIG. 10, each received binary code applied to inverse quantizer decoding circuit 301 is also supplied to log converter 1001. The log converter may comprise a table in read only memory form that is addressed by signal u(n). For each input code u(n), converter 1001 generates a signal m(n) corresponding to a multiple of the logarithm of coded signal u'(n). The m(n) signal is applied to summing circuit 1005 and the summing circuit output is applied to exponential converter 1015 through one code delay 1010. The output of delay 1010 is also fedback to summer 1005 via scaler circuit 1020. The resulting output of the summer circuit corresponds to the logarithm of the step size $$\log \Delta(n) = \log \Delta(n-1) + \log M(n) \quad (5)$$

Exponential converter 1015 is a read only memory holding a table addressed by the output of delay 1010. The table is constructed to provide a signal representative of the exponential of the coded signal from delay 1010, i.e., the step-size signal of equation 5. The step-size signal $\Delta(n)$ from exponential converter 1015 is applied to decoding circuit 301 of FIG. 3 as required for ADPCM operation and the log step-size signal d(n) is supplied to noise estimator circuit 330. Alternatively, a signal processing arrangement such as illustrated in FIG. 9 may be used to generate the d(n) and $\Delta(n)$ signals by providing a set of permanently stored instruction signals such as set forth in FORTRAN language form in Appendix C.

As illustrated in FIG. 3, the quantized signal u"(n) from decoding circuit 301 is supplied to summing circuit 310, all-zero predictor 305, predictive parameter generator 325 and noise estimator circuit 330. Predictive parameter generator 325 reconstructs the predictive parameter signals a and b responsive to the succession of u"(n) signals applied thereto in accordance with equations 2 and 3.

All-zero predictor 305 is operative responsive to signal u"(n) and predictive parameter signals a' from generator 325 to produce an all-zero predictive signal in accordance with equation 1c. The zero predictive signal is summed with the output of all-pole predictor 315 in summing circuit 320 and the total predictive signal is supplied to an input of summer 310. The sum of the input signal u"(n) and the predictive signal from summer 320 formed in summer 310 is sent as an input to all-pole predictor 315. The all-pole predictor operates to modify the output from summer 310 responsive to pole predictive parameter signals b' from generator 325. All of the decoder operations may also be accomplished using the processor apparatus of FIG. 9 in accordance with the permanently stored instructions of Appendix A to perform the decoder functions.

Noise estimator 330 is adapted to provide a set of filter control signals α and β to the post filter responsive to the log step-size signal d(n) and the a'(1) predictive coefficient signal from predictive parameter generator 310.

The decoder predictive output signal y'(n) is obtained from summer 310 and constitutes a digital coded replica of the speech signal applied to summing circuit 206 of the encoder of FIG. 2. This replica, however, also includes quantizing noise and transmission channel noise that degrades intelligibility. Post filter 335 in FIG. 3 modifies signal y'(n) so as to enhance the signal spectral portions and attenuate nonsignal spectral portions determined by zero predictive parameter signal and the pole predictor parameter signals from generator 325 to the degree specified by control signals α and β from noise estimator 330. In accordance with the invention, the spectrum of each successive sample of signal y(n) is modified in accordance with control signals α(n) and β(n) for that sample whereby the quality of each sample is improved.

Figure 4:
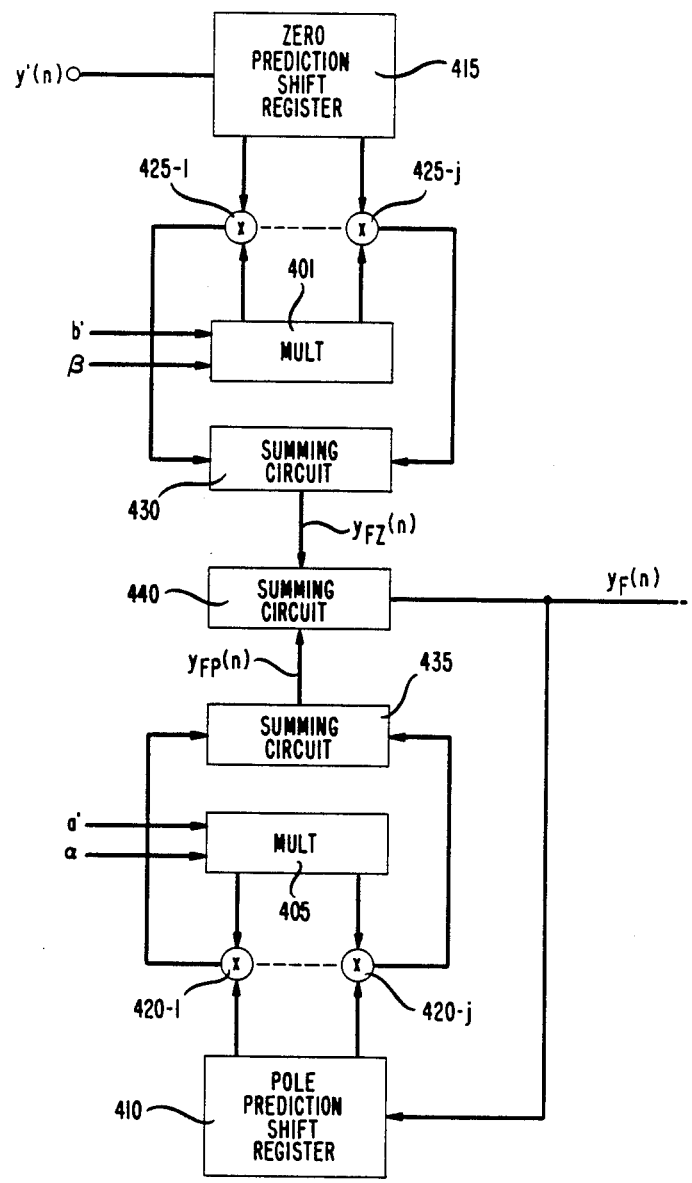
FIG. 4 shows a detailed block diagram of a post filter circuit illustrative of the invention.

A detailed block diagram of the post filter is depicted in FIG. 4. The circuit of FIG. 4 includes multiplier circuits 401 and 405, pole prediction shift register 410 and associated multiplier circuits 420-1 through 420-j, zero prediction shift register 415 and associated multiplier circuits 425-1 through 425-j, and summing circuits 430, 435 and 440.

Referring to FIG. 4, signal α from noise estimator 330 is multiplied by pole predictive parameter signal a' in multiplier 405 to form a set of signals $$a_j'(n)\alpha^j \text{ for } j=1 \text{ to } 2 \qquad (6)$$

which signals are supplied to multiplier circuits 420-1 to 420-j. The output of the post filter, signal $y_F(n)$, is applied to the input of pole prediction shift register 410 and the successively delayed outputs therefrom are combined with the signals from multiplier 405 in multiplying circuits 420-1 to 420-j. The signals from multipliers 420-1 to 420-j are then summed in summing circuit 435 to form signal $$y_{FP}(n) = \sum_{j=1}^{2} a_j'(n)\alpha^j y_F(n-j). \qquad (7)$$

The output of summing circuit 435, $y_{Fp}(n)$, is added to the output of summing circuit 430 in summing circuit 440 and the resulting signal, $y_F(n)$ is transmitted to the input of pole shift register 410.

Multiplier 401 is operative to form the product signal $$b_j'(n)\beta^j \text{ for } j=1 \text{ to } 6 \qquad (8)$$

where β is obtained from noise estimator 330 and $b_j'$ is the zero predictive parameter signal set from predictive parameter generator 325. The output speech signal from the decoder of FIG. 3 is applied to zero prediction shift register 415. Product signals from multiplier 401 are multiplied by the delayed outputs of zero predictor shift register 415 in multiplier circuits 425-1 through 425-j and the resultant signals are summed in summing circuit 430 to form signal $$y_{FZ}(n) = \sum_{1}^{6} b_j'(n)\beta^j y'(n-j). \qquad (9)$$

The output of the post filter circuit of FIG. 4, signal $y_F(n)$ corresponds to $$y_F(n) = y_{FZ}(n) + y_{FP}(n) = \qquad (10)$$

$$\sum_{1}^{2} a_j'(n)\alpha^j y_F(n-j) + \sum_{1}^{6} b_j'(n)\beta^j y'(n-j).$$

Where the processor of FIG. 9 is utilized to perform the decoder operations illustrated in FIG. 3, the post filter may be implemented by adding further instructions to the program memory of FIG. 9. A set of such instructions is set forth in FORTRAN language in Appendix B attached hereto.

Figure 5:
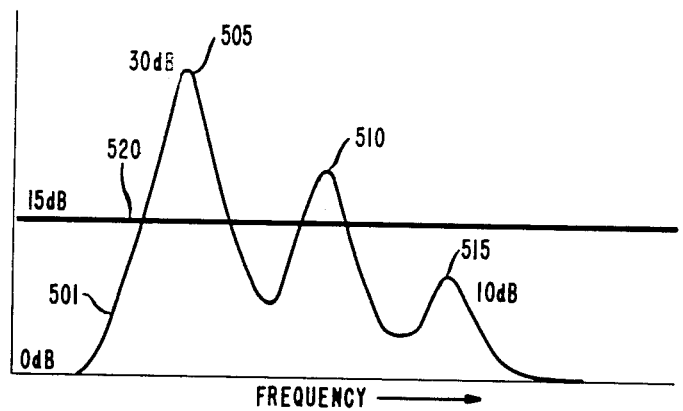
FIG. 5 shows waveforms illustrative of signal spectra obtained from the decoder circuit of FIG. 3.

FIG. 5 illustrates the effect of the post filter circuit of FIG. 4 on the output of the decoder of FIG. 3. Waveform 501 shows the spectrum of a speech signal at the output of a predictive decoder. The speech signal includes formant regions having peaks 505, 510, and 515 as indicated. Formant peak 505 is 30 db and the formant peak 515 is 10 db. The flat noise spectrum of 15 db at the decoder output is illustrated in waveform 520. The noise level in the regions outside formant regions is relatively high and reduces the quality of the speech signal.

Figure 6:
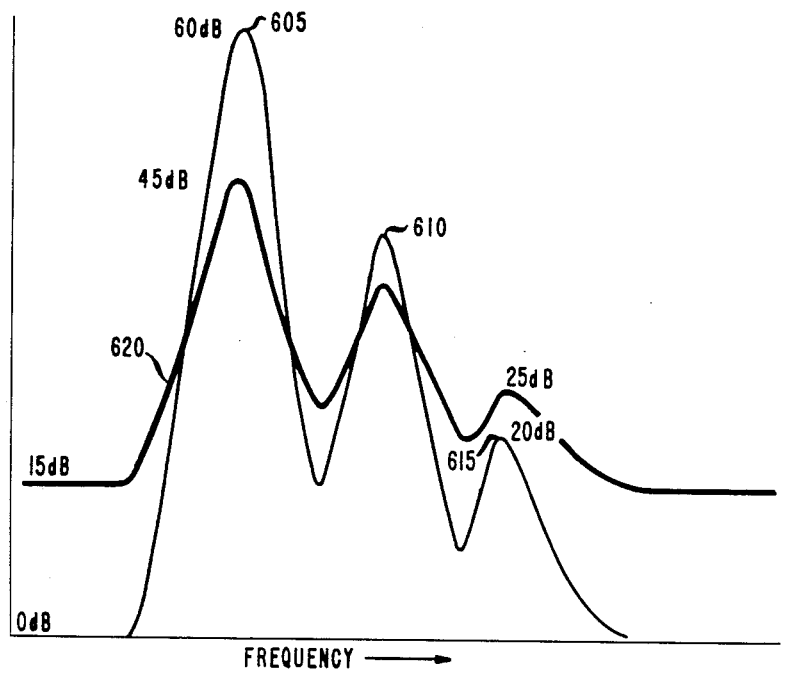
FIG. 6 shows waveforms illustrative of signal spectra obtained from the filter circuit of FIG. 4.

The post filter is operative to modify the speech signal and noise as illustrated in FIG. 6. The speech signal appearing at the output of the post filter is shown in waveform 601 and includes formant regions having peaks 605, 610 and 615. The shape of the speech signal spectrum is modified so that the formant peaks are raised as indicated. The noise spectrum of waveform 620 is modified so that the noise is enhanced within the formant regions and attenuated outside the formant regions. As is evident from a comparison of FIGS. 5 and 6, the use of filter increases the signal-to-background noise ratio and redistributes the noise so that its perceived effect is mitigated.

Filter control signals α and β are generated in noise estimator circuit 330 as a function of prediction gain measure by the first all-pole predictor coefficient a'(1) and quantization noise measured by the quantizer stepsize Δ(n) in signal u"(n) at the input of decoding circuit 301. Control signal α(n) may be selected according to $$\alpha(n) = 0.98 \, \alpha(n-1) + 0.02 \, \alpha \qquad (11)$$

where $\alpha = \exp[-t \, a_1(n)/(\Delta(n) - \Delta_{min})]$ and $t \approx 0.02$ for a quantizer having $\Delta_{max} \approx 1000$; $\Delta_{min} \approx 1$.

In the range $10 < \Delta < 100$, α of equation 10 approximates the linear mapping $$1 - t \, a_1(n)/(\Delta(n) - \Delta_{min}) \qquad (12)$$

Figure 11:
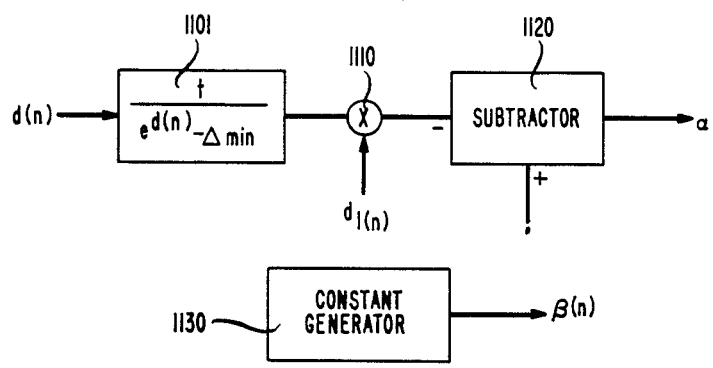
FIG. 11 shows a circuit that may be used as a noise estimator circuit in the decoder of FIG. 3.

A circuit that may be used to form the SNR estimate signal for each received digital code is shown in FIG. 11. Referring to FIG. 11, a signal d(n) corresponding to the logarithm of the step-size signal is applied to the input of converter circuit 1101. This converter circuit is a read only memory addressed by signal d(n) permanently storing values corresponding to the function $$t/(e^{d(n)} - \Delta_{min}) \qquad (13)$$

that is responsive to addressing signals d(n). The output of converter 1101 is multiplied by predictive parameter signal $a_1(n)$ and the resultant is subtracted from 1 in subtractor 1120 to form filter control signal $\alpha(n)$. Filter control signal $\beta(n)$ may be formed in a manner similar to signal $\alpha(n)$ responsive to the all-pole predictive parameter signals $b_j(n)$. Alternatively, a fixed value of $\beta$ may be selected as in selector circuit 1130. The signals $\alpha(n)$ and $\beta(n)$ from the quality estimator circuit arrangement of FIG. 11 are applied to post filter circuit 325 of FIG. 3. A set of these control signals are generated for each sample n. The signal processing arrangement of FIG. 9 may also provide the noise estimating function by including a set of permanently stored instruction signals such as set forth in Appendix D in FORTRAN language form in program store 920.

Figure 12:
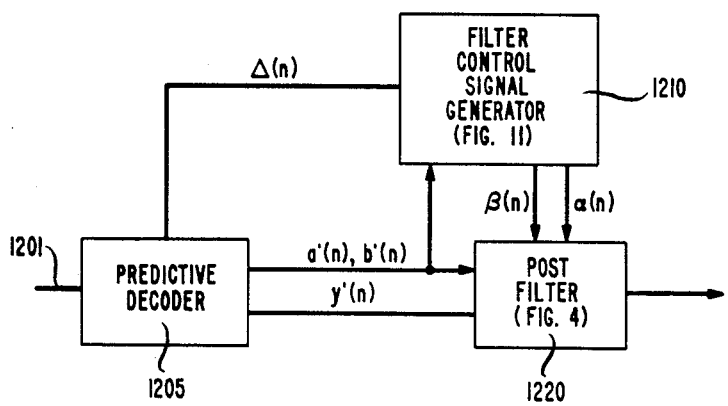
FIG. 12 shows a block diagram of an arrangement that may be used as a post filter circuit independent of the decoder circuit of FIG. 3.

The post filter circuit shown in FIG. 3 is incorporated in the decoder shown therein. In an alternative arrangement shown in FIG. 12, the post filter according to the invention may be connected to many types of predictive decoders to provide signal modification. Referring to FIG. 12, a predictively coded signal u'(n) is supplied to predictive decoder 1205 via transmission channel 1201. Decoder 1205 as is well known in the art generates predictive parameter signals a(n) and b(n) and a step-size signal $\Delta(n)$ for each coded input signal u''(n). The $\delta(n)$ signal and the a(n) and b(n) signals are combined in noise estimator circuit 1210 and the resulting filter control signals $\alpha(n)$ and $\beta(n)$ therefrom are applied to filter 1220. Estimator circuit 1210 may comprise the circuit shown in FIG. 11 and filter 1220 may comprise the post filter circuit arrangements described with respect to FIG. 4. Advantageously, the post filter of FIG. 12 may be connected to already operating predictive decoder circuits without the need for design changes.

The invention has been described with reference to a particular embodiment thereof. It is to be understood, however, that various changes and modifications may be made by those skilled in the art without changing the scope or spirit of the invention. For example, the output of the noise estimator circuit in the decoder may fedback to the transmitting coder or to a central control point to adapt the communication bit rate of the coder or the system so as to improve the speech signal coding.

APPENDIX A

PROGRAM FOR ADPCM DECODER

```
C       Assumes data is processed in blocks of 256
C       samples.
Dimensioned   Quantities with negative indices are appropriate
        values from preceding block.
C       Input to system is the sequence of quantized
C       prediction error amplitudes, U(N)
C       Output of pole-predictor is XP(N)
C       Output of zero-predictor is XZ(N)
C       Output of ADPCM decoder is Y(N)
        COMMON /COEFF/ A(J,N),B(J,N)
        DIMENSION U(256), XZ(256), XP(256), XP(256),
            XZ(256), Y(256), YF(256)
        DIMENSION A(2,256), B(6,256)
        DO 1 N = 1,256

DO 100 J = 1,2
100     A(J,N) = A(J,N-1) * (511/512) + .008 * SIGN(1.0,
        U(N-1)) * SIGN(1.0, Y(N-1-J))
        DO 400 J = 1,6
400     XZ(N) = B(J,N) * U(N-J) + XZ(N)
        Y(N) = XP(N) + XZ(N) + U(N)
1       CONTINUE
```

APPENDIX B

PROGRAM FOR ADPCM POST FILTER

```
C       Input of post filter is Y(N)
C       Output of post filter is YF(N)
        COMMON /COEFF/ A(J,N),B(J,N)
        DIMENSION A(2,256), B(6,256),
            Y(256), YF(256)
```

```
      DO 11 N=1,256
      YFZ = 0.
      DO 500 J = 1,6
500   YFZ = B(J,N) * (BETA**J) * Y(N-J) + YFZ
      YFP = 0
      DO 600 J = 1,2
600   YFP = A(J,N) * (ALPHA**J) * YF(N-J) + YFP
      YF(N) = YFZ + YFP
11    CONTINUE
```

APPENDIX C STEP SIZE GENERATOR PROGRAM

```
C       ADAPTIVE STEP SIZE QUANTIZER
C       D IS STEP SIZE  E IS A MULTIPLIER XIN,XOUT ARE
C       QUANTIZER INPUTS
        DIMENSION E(2) A(1) R(2)
C       L IS QUANTIZER OUTPUT LEVEL NUMBER
C       A IS THRESHOLD AMPLITUDE OF QUANTIZER,
C       R IS OUTPUT AMPLITUDE
        E(1)=0.95
        E(2)=1.11
        A(1)=1.
        R(1)=0.37
        R(2)=1.63

ADAPT=E(LPREV)
        D=DPREV*ADAPT
        DPREV=D

XMAG=ABS(XIN)
        IF(XMAG.GT.A(1)*D) Q=R(2)
        IF(XMAG.GT.A(1)) L=2
        IF(XMAG.LE.A(1)) Q=R(1)
        IF(XMAG.LE.A(1)) L=1

QQ=Q*D

XOUT=SIGN(QQ,XIN)

LPREV=L
```

APPENDIX D NOISE ESTIMATOR PROGRAM

```
C       NOISE ESTIMATOR BASED ON STEP SIZE D AND FIRST
C       PREDICTOR A
C       DMIN IS MINIMUM STEP SIZE    D IS STEP SIZE
C       DMAX IS MAX STEP SIZE, MAX. SPEECH AMPLITUDE IS
C       ASSUMED TO BE 2000
        T=0.02
        TT=0.98
        PPX=0.8
        P=1.-(2.78**(-T*(D-DMIN)*1000./DMAX)/ABS(A)))
        PP=TT*PPREV+(1.-TT)*P
        IF(PP.GT.PPX) PP=PPX
        IF(PP.LE.PPX) PP=PPX

PPREV=PP
```

What is claimed is:

1. In a digital communication system having means for producing a predictively decoded signal responsive to received digital codes having from time to time a variable number of bits in each of said codes, and means for generating predictive parameter signals responsive to each said received digital code, a method for reducing the effects of quantizing noise in the predictively decoded signal, of the type including
   generating at least one corrective signal related to said effects, and
   filtering the predictively decoded signal in response to the corrective signal and the predictive parameter signals to enhance some portions of the predictively decoded signal and to suppress other portions of the predictively decoded signal,
   said method being characterized in that
   the corrective signal generating step includes
   detecting quantizing information other than the number of bits in a received digital code, and
   combining the detected quantizing information with at least one predictive parameter signal separate from and prior to the use of the predictive parameter signals in the filtering step,
   whereby the corrective signal is responsive to changes in quantizing noise even in the absence of a change in the number of bits in a received digital code.

2. In a digital communication system, a method as claimed in claim 1
   further characterized in that
   the detecting step includes producing a signal representative of quantizing step size of each received digital code, and
   the filtering step includes
   relatively enhancing those portions of the predictively decoded signal least likely to be affected by the relatively larger quantizing step sizes.

3. In a digital communication system, a method as claimed in claim 1
   further characterized in that
   the detecting step includes producing a signal representative of the step size of each received digital code, and
   the combining step includes forming a signal $\alpha(n)$ corresponding to $$K\alpha(n-1)+(1-K)\exp[-ta_1(n)/(\Delta(n)-\Delta_{min})]$$

for each received digital code $u'(n)$,
   where K is a parameter relatively near unity, $\alpha(n-1)$ represents the previous value of $\alpha(n)$, $\Delta(n)$ and $\Delta_{min}$ relate to quantizer step sizes, and $a_1(n)$ represents a predictive parameter signal.

4. A digital communication system of the type having
   means for producing a predictively decoded signal responsive to received digital codes having from time to time a variable number of bits in each of said codes,
   means for generating predictive parameter signals responsive to said received digital codes, and
   means for reducing the effects of quantizing noise in the predictively decoded signal, comprising
   means for generating at least one corrective signal related to said effects, and
   means for filtering the predictively decoded signal in response to the corrective signal and the predictive parameter signals to enhance some portions of the predictively decoded signal and to suppress other portions of the predictively decoded signal,
   said system being characterized in that
   the corrective signal generating means includes
   means for detecting quantizing information other than the number of bits in a received digital code, and
   means separate from the filtering means for combining the detected quantizing information and a predictive parameter signal to obtain a corrective signal responsive to changes in quantizing noise even in the absence of a change in the number of bits in a received digital code.

5. A digital communication system of the type claimed in claim 4
   further characterized in that
   the detecting means includes
   means for producing a signal representative of the quantizing step size of each received digital code, and
   the filtering means includes
   means for relatively enhancing those portions of the predictively decoded signal least likely to be affected by the relatively larger quantizing step sizes.

6. A digital communication system of the type claimed in claim 4,
   further characterized in that
   the detecting means includes
   means for producing a signal representative of the step size of each received digital code, and
   the combining means includes
   means for forming a signal $\alpha(n)$ corresponding to $$K\alpha(n-1)+(1-K)\exp[-ta_1(n)/(\Delta(n)-\Delta_{min})]$$

for each received digital code $u'(n)$,
   where K is a parameter relatively near unity, $\alpha(n-1)$ represents the previous value of $\alpha(n)$, $\Delta(n)$ and $\Delta_{min}$ relate to quantizer step sizes and $a_1(n)$ represents a predictive parameter signal.

7. In a digital communication system having means for producing a decoded signal responsive to received digital codes, and means for generating predictive parameter signals responsive to each said received digital code, a method for reducing the effects of noise in the decoded signal, of the type including
   generating a corrective signal related to said effects, and
   applying the corrective signal and the predictive parameter signals to enhance or suppress portions of the decoded signal,
   said method being characterized in that
   the corrective signal generating step includes
   detecting at least one of said effects that can vary in each of the received digital codes, and
   combining the detected effect with at least one predictive parameter signal separate from the use of the predictive parameter signals in the applying step to yield the corrective signal,
   whereby the corrective signal is responsive to significant changes in noise in each received digital code.

* * * * *